No. 851,361. PATENTED APR. 23, 1907.
A. LIPSCHUTZ.
FREIGHT CAR TRUCK.
APPLICATION FILED FEB. 16, 1907.
2 SHEETS—SHEET 1.
Fig. 1.
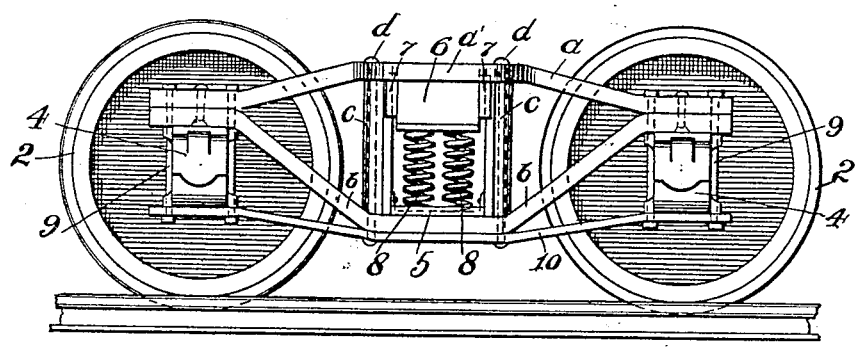
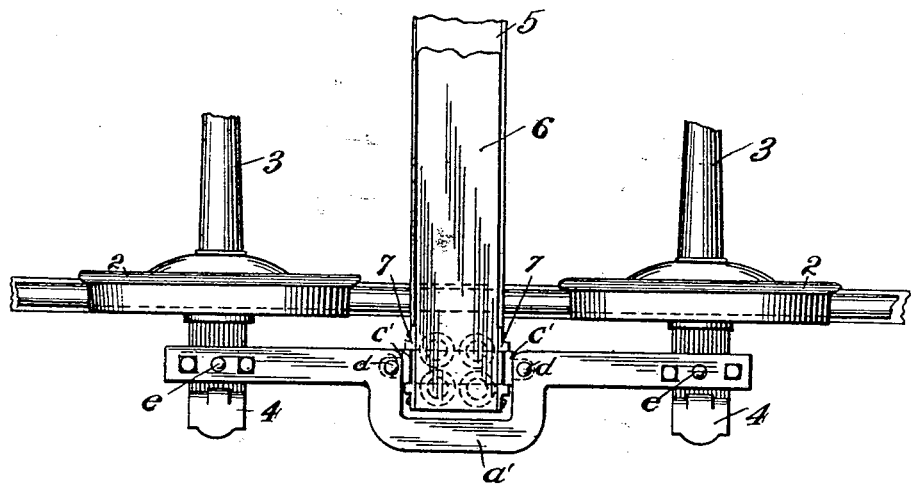
Fig. 2.
Witnesses:
A. H. Nelson
Geo. J. Read
Inventor
Arthur Lipschutz
by
Attorney No. 851,361. PATENTED APR. 23, 1907.
A. LIPSCHUTZ.
FREIGHT CAR TRUCK.
APPLICATION FILED FEB. 16, 1907.
2 SHEETS—SHEET 2.
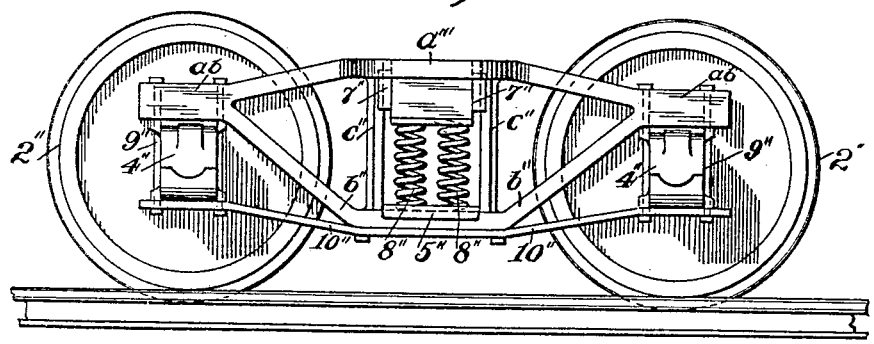
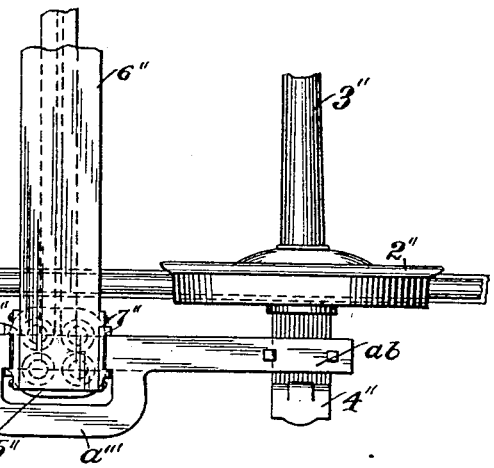
Witnesses:
A. H. Nelson
Geo. J. Read
Inventor
Arthur Lipschutz
by 
Attorney

UNITED STATES PATENT OFFICE.

ARTHUR LIPSCHUTZ, OF CHICAGO, ILLINOIS.

FREIGHT-CAR TRUCK.

No. 851,361.  Specification of Letters Patent.  Patented April 23, 1907.

Application filed February 16, 1907. Serial No. 357,674.

*To all whom it may concern:*

Be it known that I, ARTHUR LIPSCHUTZ, a citizen of the United States, and a resident of Chicago, county of Cook, and State of Illinois, have invented a certain new, useful, and Improved Freight-Car Truck, of which the following is a full, clear, and exact description, such as will enable others skilled in the art to which it appertains to make and use the same.

My invention relates to car trucks, and has particular reference to improvements in side frames for freight car trucks.

The object of my invention is to provide an improved side frame of the class described, which shall be, comparatively speaking, of minimum weight and maximum strength.

A further and particular object of the invention is to provide an improved side frame of the rigid arch bar type, which shall be so constructed that the truck-bolster may be placed in position or removed from the truck without disassembling either of the side frames of the truck.

Still further objects of my invention will appear hereinafter.

My invention consists generally in a rigid arch bar side frame for car trucks, of the construction and combination of parts hereinafter described and particularly pointed out in the claims.

My invention will be more readily understood by reference to the accompanying drawings, forming a part of this specification and in which:—

Figure 1, is a side elevation of a car truck having a side frame which embodies my invention. Fig. 2, is a plan view thereof, and Figs. 3 and 4, are similar views illustrating a side frame embodying my invention as the same appears when made up of the necessary elements permanently united as by casting, forging, or welding.

An ordinary car truck frame of the arch bar type is composed of upper and lower arch bars connected by strut-like parts or columns and column bolts. The end of the truck bolster is placed between the columns and is guided thereby, resting upon the bolster springs, which latter are supported by the lower arch bar. The ends of the upper and lower arch bars are placed together and are secured upon the journal boxes by large journal-box bolts. When it is desired to remove the bolster from the frame it becomes necessary to take out these journal-box bolts and also the column bolts in order that the upper arch bar may be taken out of the way of the bolster. The placing of a bolster in a rigid arch bar truck involves like operation and labor. In carrying out my invention I avoid the foregoing difficulty and attendant labor by bowing, or bending, the middle portion of the upper arch bar outwardly far enough to clear the end of the truck bolster. By so doing I avoid the necessity for dismembering the side frame, as it will be obvious that the top of my improved side frame is thereby left entirely open, so that the bolster and the bolster springs may be readily placed in position or removed from the frame without disturbing any part thereof.

As above explained, the principal members going to make up a rigid arch bar truck frame are fastened together by bolts in order that they may be taken apart. As will be better explained hereinafter, I further improve such side frames by permanently securing the members thereof together as by rivets, or in other well-known ways, it being evident at once that this may be done when the top arch bar is constructed in the manner above described; that is, I do not find it necessary to dismember my improved side frame for any of the reasons or causes recited in the case of the ordinary arch bar frame, and therefore, make my frame a complete article in itself by rigidly and permanently uniting the members or elements thereof, by suitably locked bolts, if desired, or preferably, by means of rivets, or by casting, forging, or welding the elements together.

Referring now to Figs. 1 and 2, of the drawings, 2, 2, represent the truck wheels; 3, 3, the axles; 4, 4, the journal boxes; 5, the spring plank or channel; 6, the truck bolster; 7, 7, the bolster guides, which are parts of the bolster; and 8, 8, the bolster springs. My improved side frame comprises the upper arch bar, $a$, the lower arch bar, $b$, and the columns, $c$, $c$, together with the rivets, $d$, $d_{,}$, and if desired, the rivets, $e$, $e$, The ends of the arch bars are parallel, lying one upon the other, and they are secured to the journal boxes by the usual journal-box bolts, 9. The upper arch bar, $a$, is unlike the ordinary arch bar, the difference residing in the formation of its middle portion. As indicated in Fig. 1, and as clearly shown in Fig. 2, said middle portion, $a'$, is bowed or bent outwardly from points adjacent to the columns, to a point or line beyond the end of the bolster. The inner portions, or faces, $c'$, of the columns, project within, that is, are exposed within the gap or opening thus provided in the upper arch bar. This being the case it will be obvious that the springs and the bolster may be placed in or removed from the side frame by mere vertical movement therein; the bolster guides 7, 7, freely sliding into or out of engagement with the column portions of the side frame. When the truck is in use the weight of the car is sufficient to prevent the bolster from jumping out of the truck frame, and I do not find it necessary to employ locking bars across the tops of my improved side frame; nevertheless, these may be added when desired. I employ the usual tie bar, 10, as a means of connecting the bottom of the side frame with the bottoms of the journal boxes. This being a desirable and permanent part of the side frame, may be fastened by means of the rivets, $d$, though I do not confine my invention to so doing, as obviously the tie bar may be secured to the side frame by separate bolts or rivets. While I have shown and described the rivets, $d$, and $e$, and prefer their use, it will be obvious that screw-threaded bolts may be substituted therefor, but even in such case, I prefer to batter the threads of the bolts, or otherwise lock the nuts thereon, to insure the continuance of rigidity throughout the frame during the period of its use. As stated above, and as represented by the integral parts or members, $a''$, $a'''$, $b''$, $c''$, and $a^b$, $a^b$, in Figs. 3 and 4, the riveting, or bolting together of the several parts of the frame may be avoided by casting, forging, or welding them together. It is also obvious that the cross-sectional forms of the upper and lower arch bars and the columns of my side frame may be, and should be modified to conform to the various load requirements met with in railroad service. As such modifications, and others will suggest themselves to one skilled in the art, I do not confine my invention to the specific structure herein shown and described.

Having thus described my invention, I claim as new and desire to secure by Letters Patent:

1. A rigid arch bar side frame for freight car trucks, comprising a lower arch bar in combination with an upper arch bar and bolster-guiding columns, suitably united, the middle portion of said upper arch bar being bowed or bent outwardly, to avoid the end of a truck bolster slidably engaged with said columns, substantially as described.

2. In a rigid arch bar side frame for freight car trucks, a lower arch bar in combination with bolster-guiding columns and an upper arch bar having its middle portion bowed or bent outwardly from points adjacent to the upper ends of said columns to permit a bolster to be slidably engaged with or disengaged from said columns, substantially as described.

3. A truck frame comprising a lower arch bar in combination with an upper arch bar, bolster-guiding columns extending between said arch bars, rivets fastening such parts together, and said upper arch bar being bowed or bent outwardly from points adjacent to the upper ends of said columns to avoid contact with the end of a bolster when being engaged with or disengaged from said columns substantially as described.

In testimony whereof, I have hereunto set my hand, this 14th day of February, 1907, in the presence of two subscribing witnesses.

ARTHUR LIPSCHUTZ.

Witnesses:
M. SIMON,
A. W. NELSON.